March 4, 1952 A. J. TROYER 2,588,309
SIZING ROLL CONSTRUCTION FOR POTATO GRADERS
Filed July 29, 1950 2 SHEETS—SHEET 1

Inventor
Abner J. Troyer
By Freace & Bishop
Attorneys

March 4, 1952     A. J. TROYER     2,588,309

SIZING ROLL CONSTRUCTION FOR POTATO GRADERS

Filed July 29, 1950     2 SHEETS—SHEET 2

Inventor
Abner J. Troyer
By
Frease and Bishop
Attorneys

Patented Mar. 4, 1952

2,588,309

UNITED STATES PATENT OFFICE 2,588,309

SIZING ROLL CONSTRUCTION FOR POTATO GRADERS

Abner J. Troyer, Smithville, Ohio

Application July 29, 1950, Serial No. 176,608

7 Claims. (Cl. 209—106)

The invention relates generally to potato grading machines of the type shown in U. S. Patent No. 2,244,546, issued June 3, 1941, to Harry C. Stockdale. More particularly, the invention relates to the grooved rubber sizing rollers which are mounted in mating rows forming circular sizing or grading openings between the rows.

In prior potato grading machines of this type, the sizing rollers are provided with a multiplicity of resilient rubber spurs or nibs throughout the annular grooves, the spurs projecting radially of the groove and arranged so that their tips define the quadrant of a circle transversely of the roller. Two of the rollers when abutted together form a groove semi-circular in cross section, and the next adjacent abutting pairs of rollers form similar adjoining grooves. The outer edges of the rollers are sometimes provided with radial slots forming projecting ribs which cooperate with the spurs to complete the semi-circular grooves.

The purpose of the spurs or nibs is to provide resilient means for gripping the potatoes without injuring them as they pass through the sizing openings formed by the grooves, and particularly to prevent injury to slightly oversize potatoes or potatoes having small warts or similar protuberances. If rollers with smooth unyielding grooves are used, the skins of the potatoes are apt to become injured and potatoes which are "on size," that is, the same size as the sizing openings, are likely to be crushed. Also, it is claimed that the spurs have a brushing and cleaning effect upon the potatoes.

Such rollers with nibs or spurs thereon defining the grooves work very well when they are substantially clean and free from foreign matter lodged between the spurs. However, in actual practice the dirt which is present in varying amounts on all potatoes before they are washed quickly lodges between the spurs and cakes and builds up, especially if the potatoes are moist or the soil contains considerable clay. As the potatoes continue to be run over these sizing rolls, the dirt builds up to such an extent as to destroy all the resiliency of the spurs, and often builds up beyond the tips of the spurs so as to make the sizing openings irregular and smaller than desired. This precludes accurate grading of the potatoes, and the loss of flexibility results in damaging or crushing potatoes which are on size. The caked and built-up dirt between the spurs is very difficult to clean and a thorough cleaning requires excessive time because a knife or sharp implement must be inserted between the spurs to loosen the caked dirt.

It has also been found in actual practice that the nibbed rollers quickly catch any vines, weeds or stems, as well as any burlap strings from potato sacks which may be mixed in with the potatoes being sized. Such stringy materials immediately become wrapped around the rollers and destroy the resiliency of the spurs and accuracy of grading. When the grader becomes choked with such stringy materials, it is almost impossible to clean without excessive expense.

Consequently, the continued use of a potato grader having the nibbed rollers requires frequent cleaning of the machine or expensive cleaning of the potatoes before they reach the grader. Moreover, other vegetables such as onions cannot be sized or graded in such rollers without causing considerable skinning or shucking of the same.

It is an object of the present invention to provide a novel sizing roll construction for a potato grader which will overcome the foregoing disadvantages, and yet accomplish the intended purposes of the prior rollers with resilient spurs.

More specifically, it is an object of the present invention to provide a novel sizing roll construction which does not have any nibs or spurs to catch and build up dirt, or to catch and cause wrapping of vines, weeds and strings.

Another object is to provide a novel sizing roll construction which has a smooth annular groove but nevertheless provides sufficient resiliency to preclude crushing or other damage to on size potatoes passing through the sizing opening.

A further object is to provide a novel sizing roll construction which is not only smooth to prevent catching and building up of dirt and stringy materials thereon, but is so constructed as to be self-cleaning as the potatoes pass thereover.

A still further object is to provide a novel sizing roll construction which can be used to size vegetables having tender skins such as onions without skinning or damaging the same.

Finally, it is an object of the present invention to provide a potato grader having a novel sizing roll construction which is inexpensive to manufacture, and does not have any projections for catching dirt or stringy materials, so that all of the rollers can be quickly and easily cleaned in a minimum amount of time.

The foregoing and other objects are attained by the parts, constructions and arrangements comprising the present invention, a preferred embodiment of which is shown in the accompanying drawings as exemplifying the best known mode of carrying out the invention, the invention being set forth in detail in the following specification, and the scope of the invention being defined in the appended claims.

Referring to the accompanying drawings in which a preferred embodiment of the invention is shown by way of example:

Similar numerals refer to similar parts throughout the several views of the drawings.

Figure 2:
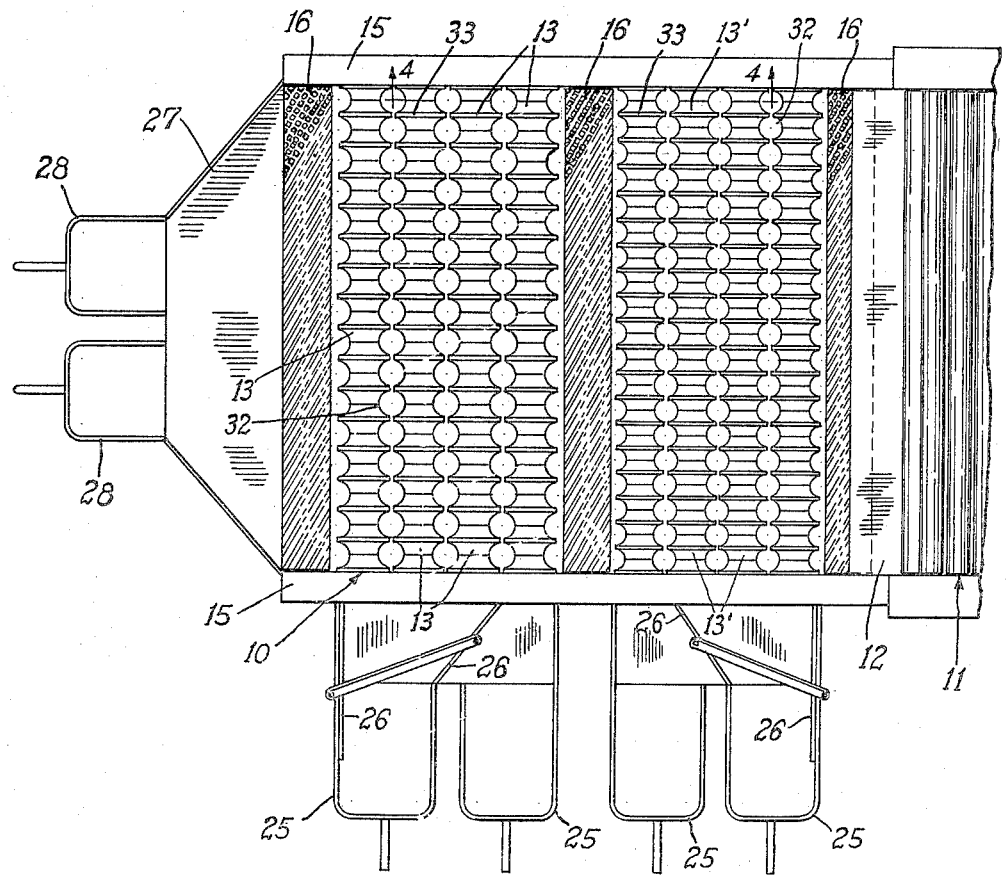
Fig. 2 is a fragmentary plan view thereof.
Figure 1:
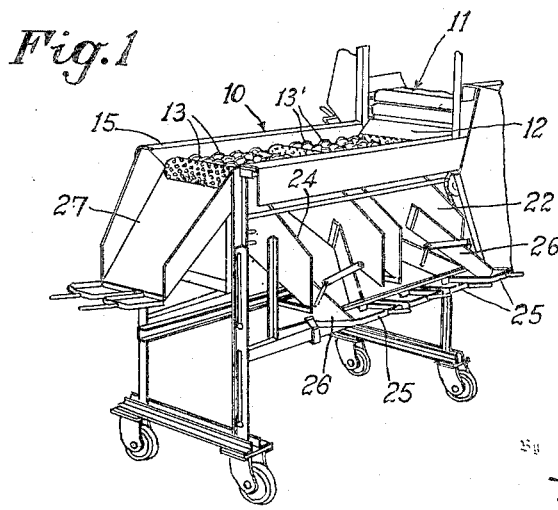
Figure 1 is a fragmentary perspective view showing a potato grader embodying the novel sizing roll construction.
Figure 3:
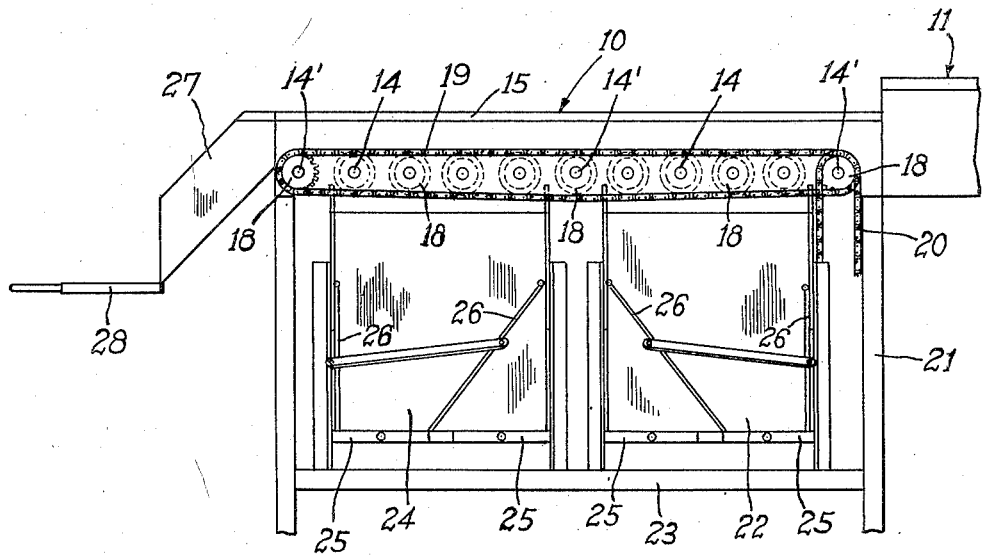
Fig. 3 is a fragmentary side elevational view thereof.
Figure 4:
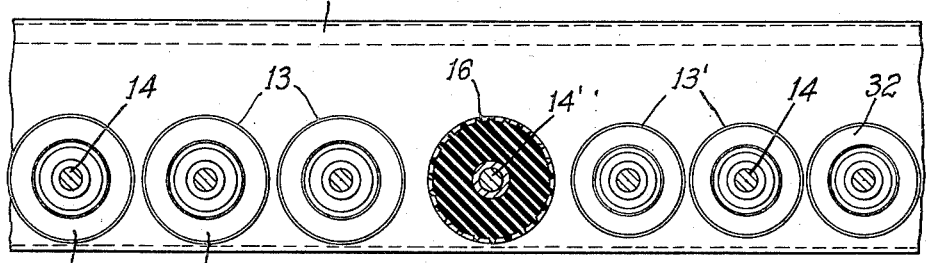
Fig. 4 is an enlarged fragmentary sectional view as on line 4—4, Fig. 2.

The potato grading machine shown in Figs. 1, 2 and 3 preferably includes a potato grader table indicated generally at 10 onto which the potatoes are discharged from a wood roller conveyor and sorting table indicated generally at 11. Only the discharge end of the sorting table is shown, there being preferably an inclined discharge plate 12 for discharging the potatoes onto the grading table.

The novel rubber sizing rolls 13 and 13' are mounted on parallel transverse shafts 14 journaled in a suitable manner in the side rails 15, the rolls 13 being of one size, and the rolls 13' being of another size. The usual cleaning rolls 16 are provided on each side of the sections of rolls 13 and 13'. These cleaning rolls may have drive shafts 14' which are journaled in the side rails 15, and the rolls are preferably provided with a multiplicity of resilient rubber spurs or nibs which may be arranged around the row in substantially spiral form, as indicated. The rolls 16 apply a brushing and cleaning action to the potatoes passing thereover and the middle row 16 serves to separate the two sections of rollers of different size.

As indicated in Fig. 3, the shafts 14 and 14' all have mounted thereon at one end sprockets 18 for being driven by a suitable chain 19 to convey the potatoes over the table. Preferably the shaft 14' of the inner cleaning roll 16 is driven by a suitable sprocket and chain 20 from a driving motor (not shown) which may be mounted in a usual manner on the frame 21 of the sorting table. Preferably the sprockets 18 are all the same diameter and have the same number of teeth, so that they are all driven at the same speed.

An inclined discharge chute 22 is mounted on a cross member 23 of the frame, for discharging potatoes which are sized by the rollers 13' and dropped therethrough. A similar discharge chute 24 is mounted under the rollers 13 for discharging potatoes dropping therethrough. Each of the chutes 22 and 24 may be provided at their bottom ends with the usual bag holders 25 and the chutes may have adjustable deflectors 26 mounted thereon for deflecting the potatoes into one or the other of two bags located at the bottom of each chute. The potatoes which are too large to pass through the sizing rollers 13' and 13 are carried over the last cleaning roll 16 and thence discharged into a chute 27 having bag holders 28 at the bottom thereof. If desired, adjustable deflectors similar to the deflectors 26 may be provided in the chute 27.

Figure 6:
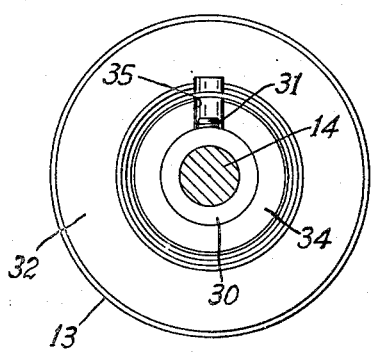
Fig. 6 is a transverse sectional view as on line 6—6, Fig. 5.

The sizing rolls 13 and 13' are preferably made of relatively soft molded rubber, and are provided with annular grooves in such manner that when a plurality of the rollers are axially abutted on the shafts 14 they provide in effect a series of spools forming grooves of semi-circular cross section, so that the mating grooves of adjacent rows of rollers form circular sizing openings through which potatoes of that size or under may drop. Preferably each roller 13 and 13' is molded onto a metal bushing 30, as best shown in Figs. 5 and 6, and the bushings are fixed on the shafts 14 in axial abutment with each other by means of headless set screws 31.

Each of the rollers has a body of rubber molded around the bushing 30, and the rubber body has smooth annular grooves 32 on opposite sides forming a central rim portion 33 therebetween. The grooves 32 each form in cross section substantially a quadrant of a circle, so that the grooves may be described as annular quadrantal grooves. Each side of the rubber body of the roller is provided with a flat annular abutment surface 34 for abutting a like surface of the next adjoining roller, and on one side each roller is provided with a slot 35 extending radially outward to the adjacent groove 32 for receiving the set screw 31.

Figure 5:
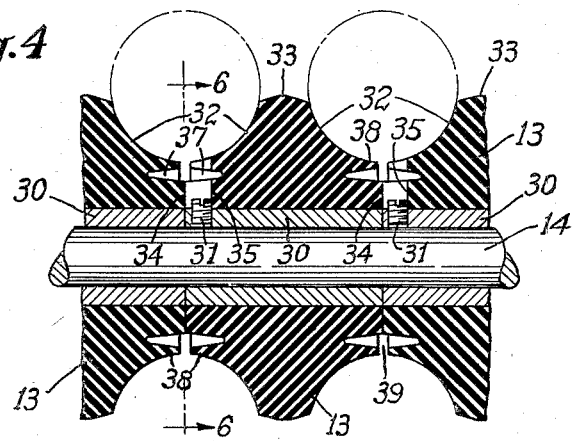
Fig. 5 is a further enlarged fragmentary view of several abutting rollers on the same shaft.

As indicated in Figs. 2 and 5, when the rows of rollers 13 and 13' are mounted in parallel relation in the side rails 15 of the grading machine, with the intermediate ribs 33 thereof closely adjacent to each other, the grooves 32 form rows of substantially circular sizing openings through which potatoes of substantially that size or less may drop. The rollers 13' may be of a size to pass standard No. 3 size potatoes, and the rolls 13 may be of a size so that the circular openings pass standard No. 2 size potatoes. Consequently, all potatoes which are discharged into the chute 27 are standard No. 1 size potatoes.

The smooth annular grooves 32 of the novel sizing rollers do not offer any rough surface to catch and entwine vines, weeds and stringy materials, or on which the dirt from the potatoes may become caked and built up to change the size of the groove and thus destroy the accuracy of the sizing operation. Moreover, any dirt which may collect on the grooves through continued use is quickly and easily loosened by merely inserting a cylindrical rod or stick into the sizing holes formed by the grooves. Obviously, the rollers with their smooth annular grooves are much cheaper and easier to manufacture from molded rubber than rollers with spurs or nibs.

In order to provide sufficient resiliency in the grooves to prevent crushing or other damage to on size potatoes which pass through the sizing openings, or to potatoes having warts and the like on their surfaces, the novel rollers 13 and 13' are provided with novel means for making the base of each semi-circular groove formed by two adjoining quadrantal grooves 32 extremely soft and flexible. As shown in Figs. 5 and 6, the edge portions of each roller formed by the intersection of the grooves 32 and the abutment surfaces 34 is provided with a concentric or annular recess or groove 37 forming a thin flexible annular rib 38 at the base of each groove. Preferably the ribs 38 of abutting rollers are spaced apart slightly as indicated at 39 to allow them to flex freely when a potato is pressed against them in passing through the sizing opening.

Thus each semi-circular groove formed between two abutting rollers is provided at its base or inner portion with two flexible ribs 38, and when the rollers are mounted in parallel adjacent rows each circular opening has diametrically opposite ribs 38 therein, so that when a potato which is on size for the opening passes therethrough, the ribs 38 can flex outwardly in diametrically opposite directions to allow the potato to pass through the opening without crushing or damaging the same.

These soft flexible annular ribs 38 are continually flexed by the potatoes passing through the sizing openings, with the result that they constantly break off and remove the dirt which would otherwise tend to cake thereon, and thus the rolls are substantially self-cleaning. Consequently, a grading machine employing the novel sizing rollers may be used for long periods without requiring cleaning.

Due to the smoothness of the grooves 32 forming the sizing openings, and the soft yielding bases formed by the flexible annular ribs 38, the machine may be used satisfactorily for sizing other vegetables such as onions, because their skins are not bruised or partially removed by contact with the smooth grooves, as is the case with prior sizing rollers employing a multiplicity of spurs or projections for gripping the vegetables as they pass through the sizing openings.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. In a potato grading machine, a plurality of parallel rows of axially abutting rubber rollers having smooth annular grooves and forming substantially circular sizing openings between rows, each groove being formed by two abutting rollers, and the peripheries of said abutting rollers having flexible concentric ribs forming the base of the groove.

2. In a potato grading machine, a plurality of parallel rows of axially abutting rubber rollers having smooth annular grooves and forming substantially circular sizing openings between rows, each groove being formed by two abutting rollers, and the abutting edge portions of said rollers having flexible annular ribs forming the base of the groove.

3. In a potato grading machine, a plurality of parallel rows of axially abutting rubber sizing rollers each having annular quadrantal grooves on opposite sides, whereby abutting rollers form semi-circular grooves, and the inner periphery of each quadrantal groove comprising a flexible concentric rib.

4. In a potato grading machine, a plurality of parallel rows of axially abutting rubber sizing rollers each having annular quadrantal grooves on opposite sides, whereby abutting rollers form semi-circular grooves, each roller having flat abutment surfaces intersecting said quadrantal grooves, and said abutment surfaces having annular recesses therein adjacent the quadrantal grooves forming flexible base portions in each groove.

5. A rubber sizing roller for a potato grader having annular quadrantal grooves on opposite sides, flat parallel abutment surfaces intersecting the base of the grooves, and said abutment surfaces having annular recesses adjacent said grooves forming flexible base portions in said grooves.

6. A rubber sizing roller for a potato grader having a flat abutment surface on one side and an annular quadrantal groove intersecting said surface, said surface having an annular recess adjacent its outer periphery forming a flexible base portion in said groove.

7. A rubber sizing roller for a potato grader having a flat abutment surface on one side and an annular quadrantal groove intersecting said surface, said surface having a circular recess adjacent its outer periphery providing a flexible annular rib forming the base of said quadrantal groove.

ABNER J. TROYER.

REFERENCES CITED

The following references are of record in the file of this patent:

UNITED STATES PATENTS

| Number | Name | Date |
|---|---|---|
| 2,244,546 | Stockdale | June 3, 1941 |
| 2,266,506 | Morse | Dec. 16, 1941 |
| 2,335,164 | Wayland et al. | Nov. 23, 1943 |